April 24, 1928.
A. T. BASS
1,667,301
ADJUSTABLE ROAD DRAG
Filed Feb. 19, 1927
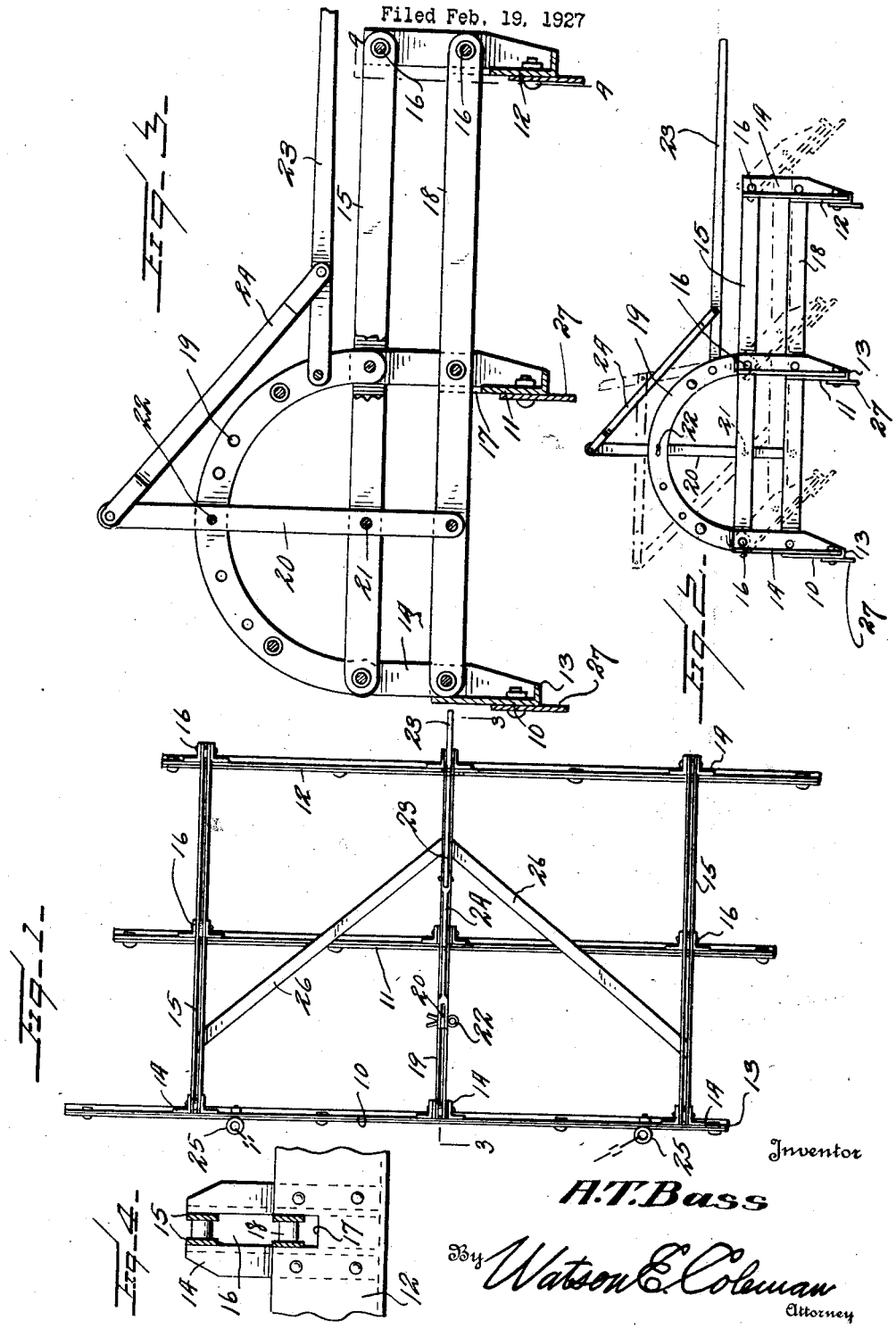
Inventor
A.T.Bass
By Watson E. Coleman
Attorney Patented Apr. 24, 1928.

1,667,301

UNITED STATES PATENT OFFICE.

AARON T. BASS, OF EATON, COLORADO.

ADJUSTABLE ROAD DRAG.

Application filed February 19, 1927. Serial No. 169,594.

This invention relates to road drags or levelers and one of the objects of the invention is to provide a heavy duty drag particularly designed to be drawn by tractors or other power operated vehicles.

A further object is to provide a drag of this character having at least three blades so that the drag will bridge any hollows in the road instead of moving down into the hollows and, therefore, making the hollows deeper as would be the case were there only two blades to the drag.

Still another object is to so construct the frame of the drag and connect it to the blades that the blades shall be braced and strengthened at the point of greatest strain.

A still further object is to provide a drag of this character with blades which may be shifted into angular relation and provide improved means for holding these blades in angularly adjusted positions.

My invention is illustrated in the accompanying drawings wherein:—

Figure 1 is a top plan view of a drag constructed in accordance with my invention;

Fig. 2 is a side elevation of the drag showing the blades angled in dotted lines;

Fig. 3 is a section on the line 3—3 of Figure 1;

Fig. 4 is a section on the line 4—4 of Figure 3.

Referring to these drawings it will be seen that the drag embodies three blades 10, 11 and 12, each of these blades being angularly bent or flanged at its lower edge, as at 13, these flanges extending rearward. The blades are riveted, bolted or otherwise attached to vertical angle irons 14. There are a pair of these angle irons disposed adjacent the ends of each blade and the upper ends of these angle irons are pivotally connected to longitudinally extending rods or bars 15 by means of bolts or other pivots 16. There is a pair of these bars 15 to each pair of angle irons and the bars may be held in spaced relation in any suitable manner. The angle irons are riveted, bolted or otherwise attached to the blades and the rear blade 12 and the intermediate blade 11 are vertically slotted, as shown in Figure 3 at 17 for the reception of a lower pair of longitudinally extending bars 18. The forward ends of these bars abut against the blade 10 and these bars 18 are also pivotally connected to the angle irons 14 by pivot bolts or like members 16.

Attached to the angle irons 14 which extend upward from the middle of the front blade to the blade 11, are a pair of arcuate bars 19 and operating between these bars is a lever 20, the lower end of which is pivoted between the bars 18, this lever being also pivoted at 21 to the bars 15. Therefore, it will be obvious that as the lever is shifted, the bars will be shifted relative to the bars 18, as shown in Figure 2, thus canting the blades 10, 11 and 12. The arcuate bars 19 are perforated at intervals for the passage of a locking pin 22 which is adapted to pass through the lever 20 and lock it in any adjusted position.

Pivotally mounted between the bars 15 adjacent the rear ends thereof, is a lever 23 which is pivotally connected by a link 24 to the lever 20. This link 24 engages the lever 23 adjacent its lower end and the lever 20 at its upper end, thus securing a compound leverage. Rings or other like devices 25 are attached to the forward blade 10 and to these rings draft chains or other draft devices may be attached. Braces 26 extend rearwardly and convergently from the forward ends of the longitudinal bars 18 to the rear portions of the intermediate bars 18 as shown in Figure 1, these braces being riveted or bolted to the longitudinal bars.

The blades 10, 11 and 12 are scraping blades and are not designed to cut the surface of the road but cutting blades 27 may be removably bolted to the blades 10, 11 and 12 and extend below the same.

A leveler and drag constructed in accordance with my invention has been thoroughly tested by me in working roads and has been found to be of great practical value for the reason that it is very strongly constructed and is thoroughly rigid. It will be seen that the constructional elements are those already on the market so that the initial cost of construction is relatively small and repairs may be readily made. If desired, by adjusting the tractor hitch, the leveler may be drawn over the ground with its blades at an inclination to the line of draft. One of the principal features of the invention lies in the manner in which the blades are connected to the angle irons and thus to the longitudinal bars which hold the blades in proper relation to each other and permit the canting of the blades. These angle irons extend down to the lower edge of the blade and thus brace the blades at their points of greatest strain and there is no tendency of the blades to tear away from the angle irons. By abutting the forward ends of the bars 18 against the forward blade the initial strain on this forward blade is transmitted to these bars almost directly which would not be the case were these longitudinal bars 18 merely pivoted to the blade 10 adjacent its upper edge. The leveler will preferably be about 12′ long and the blades will be approximately 8″ high.

Preferably the blades 10, 11 and 12, while they have the same length, are offset with relation to each other as shown in Figure 1, so as to successively project beyond each other. This permits of the draft chains, connected to the eyes 25 being so arranged that the blades 10, 11 and 12 are disposed in angular relation to the line of draft, the ends of the blades under these circumstances being disposed parallel to the line of draft.

I claim:—

1. A leveler or road drag including a plurality of transversely extending blades, a pair of spaced, upwardly extending angle irons attached to each blade at the middle thereof, a lower pair of longitudinally extending bars pivoted to the lower ends of the pairs of angle irons, an upper pair of longitudinally extending bars pivoted to the upper ends of the pairs of angle irons, a lever extending downward between said bars and pivoted thereto, an arcuate member over which said lever moves, a lever pivoted to the arcuate member, a link connecting said levers, means for locking the first named lever in any position on said arcuate member, upwardly extending pairs of angle irons attached to the blades adjacent the ends thereof, longitudinally extending bars pivoted to the upper ends of the angle irons, longitudinally extending bars pivoted to the angle irons adjacent their lower ends, the rear and intermediate blades being vertically slotted to receive said bars, said bars abutting against the forward blade.

2. A leveler or road drag including a plurality of transversely extending blades, upwardly extending angle irons attached to each blade at the middle and ends thereof, upper and lower longitudinally extending bars pivoted at their ends to the upwardly extending angle irons of the forward and rear blades and at their middles to the upwardly extending angle irons of an intermediate blade, a lever pivoted to one of the longitudinally extending bars and pivotally connected to the other bar, an arcuate member attached to certain of said angle irons and over which said lever moves, means for locking said lever in any desired position on the arcuate member, a second lever pivoted to the arcuate member, and a link connecting the second lever to the first lever.

In testimony whereof I hereunto affix my signature.

AARON T. BASS.